(12) United States Patent
Ekberg et al.

(10) Patent No.: US 8,621,203 B2
(45) Date of Patent: Dec. 31, 2013

(54) METHOD AND APPARATUS FOR AUTHENTICATING A MOBILE DEVICE

(75) Inventors: Jan-Erik Ekberg, Vantaa (FI); Kari Kostiainen, Helsinki (FI); Pekka Laitinen, Helsinki (FI); Ville Aarni, Veikkola (FI); Miikka Sainio, Kerava (FI); Niklas Von Knorring, Helsinki (FI); Dmitry Kolesnikov, Vantaa (FI); Atte Lahtiranta, Bedford, MA (US)

(73) Assignee: Nokia Corporation, Espoo (FI)

( * ) Notice: Subject to any disclaimer, the term of this patent is extended or adjusted under 35 U.S.C. 154(b) by 729 days.

(21) Appl. No.: 12/488,943

(22) Filed: Jun. 22, 2009

(65) Prior Publication Data

US 2010/0325427 A1 Dec. 23, 2010

(51) Int. Cl.
*H04L 29/06* (2006.01)
*H04L 9/32* (2006.01)
*G06F 7/04* (2006.01)
*G06F 12/14* (2006.01)

(52) U.S. Cl.
USPC ........... 713/156; 713/168; 713/169; 713/170; 713/173; 713/181; 726/4; 726/22; 726/26

(58) Field of Classification Search
USPC ........ 713/156, 168–170, 173, 181; 726/4, 22, 726/26
See application file for complete search history.

(56) References Cited

U.S. PATENT DOCUMENTS

| 6,823,454 | B1 | 11/2004 | Hind et al. | |
|---|---|---|---|---|
| 6,980,660 | B1 | 12/2005 | Hind et al. | |
| 7,171,555 | B1 | 1/2007 | Salowey et al. | |
| 7,308,431 | B2 | 12/2007 | Asokan et al. | |
| 2002/0019879 | A1* | 2/2002 | Jasen et al. | 709/240 |
| 2003/0115454 | A1 | 6/2003 | Piikivi et al. | |
| 2005/0086504 | A1* | 4/2005 | You et al. | 713/193 |
| 2005/0287990 | A1 | 12/2005 | Mononen et al. | |
| 2006/0080534 | A1 | 4/2006 | Yeap et al. | |
| 2006/0095454 | A1 | 5/2006 | Shankar et al. | |
| 2009/0138947 | A1 | 5/2009 | Schneider et al. | |
| 2009/0328141 | A1* | 12/2009 | Zhang et al. | 726/2 |
| 2010/0130240 | A1* | 5/2010 | Hart | 455/509 |

FOREIGN PATENT DOCUMENTS

EP 1 881 665 A1 1/2008
JP 2004 147252 A 5/2004

OTHER PUBLICATIONS

International search report and written opinion for corresponding international application No. PCT/FI2010/050430 dated Sep. 21, 2010, pp. 1-14.

* cited by examiner

*Primary Examiner* — Aravind Moorthy
(74) *Attorney, Agent, or Firm* — Ditthavong Mori & Steiner, P.C.

(57) ABSTRACT

An approach is provided for authenticating a mobile device. A mobile device initiates transmission of a request to an authentication platform for generating a public-key certificate to access a service from the mobile device. The mobile device receives an identity challenge and responds by initiating transmission of a tag specific to the mobile device to the authentication platform. The authentication platform uses the tag to generate a public-key certificate.

18 Claims, 10 Drawing Sheets

METHOD AND APPARATUS FOR AUTHENTICATING A MOBILE DEVICE

BACKGROUND

Wireless (e.g., cellular) service providers and device manufacturers are continually challenged to deliver value and convenience to consumers by, for example, providing compelling network services, applications, and content. Many of these services, applications, and content use or have access to personal information, financial information, or other information a user may want to remain private. Accordingly, one area of development is the creation of security and authentication mechanisms to protect user privacy and information when accessing these services and applications from mobile devices. In particular, the security and authentication mechanisms must provide sufficient levels of security while maintaining ease of use in a mobile environment. Therefore, to be competitive and encourage the use of these types of services and applications, the service providers and device manufacturers need to address the ever growing requirement for more approaches for protecting user privacy and information while minimizing the burden placed on users to implement the approaches.

SOME EXAMPLE EMBODIMENTS

According to one embodiment, a method comprises initiating transmission of a request to an authentication platform for generating a public-key certificate to access a service from a mobile device. The method also comprises receiving an identity challenge corresponding to the request. The method further comprises initiating transmission of a tag specific to the mobile device to the authentication platform. The tag is used by the authentication platform to generate the public-key certificate.

According to another embodiment, an apparatus comprising at least one processor, and at least one memory including computer program code, the at least one memory and the computer program code configured to, with the at least one processor, cause the apparatus to initiate transmission of a request to an authentication platform for generating a public-key certificate to access a service from a mobile device. The apparatus is also caused to receive an identity challenge corresponding to the request. The apparatus is further caused to initiate transmission of a tag specific to the mobile device to the authentication platform. The tag is used by the authentication platform to generate the public-key certificate.

According to another embodiment, a computer-readable storage medium carrying one or more sequences of one or more instructions which, when executed by one or more processors, cause an apparatus to receive a request from a mobile device to initiate transmission of a request to an authentication platform for generating a public-key certificate to access a service from a mobile device. The apparatus is also caused to receive an identity challenge corresponding to the request. The apparatus is further caused to initiate transmission of a tag specific to the mobile device to the authentication platform. The tag is used by the authentication platform to generate the public-key certificate.

According to another embodiment, an apparatus comprises means for initiating transmission of a request to an authentication platform for generating a public-key certificate to access a service from a mobile device. The apparatus also comprises means for receiving an identity challenge corresponding to the request. The apparatus further comprises means for initiating transmission of a tag specific to the mobile device to the authentication platform. The tag is used by the authentication platform to generate the public-key certificate.

According to another embodiment, a method comprises receiving a request from a mobile device to generate a public-key certificate for accessing a service. The method also comprises initiating transmission of an identity challenge to the mobile device. The method further comprises receiving a tag specific to the mobile device in response to the identity challenge. The method further comprises calculating a partial hash of the tag. The method further comprises calculating a full hash of the tag, a predetermined string, and the identity challenge. The method further comprises retrieving a public-key corresponding to the mobile device. The method further comprises generating a public-key signature from the full hash using the public key. The method further comprises constructing the public-key certificate to include at least the public-key signature, the public key, and the partial hash.

According to another embodiment, an apparatus comprising at least one processor, and at least one memory including computer program code, the at least one memory and the computer program code configured to, with the at least one processor, cause the apparatus to receive a request from a mobile device to generate a public-key certificate for accessing a service. The apparatus is also caused to initiate transmission of an identity challenge to the mobile device. The apparatus is further caused to receive a tag specific to the mobile device in response to the identity challenge. The apparatus is further caused to calculate a partial hash of the tag. The apparatus is further caused to calculate a full hash of the tag, a predetermined string, and the identity challenge. The apparatus is further caused to retrieve a public-key corresponding to the mobile device. The apparatus is further caused to generate a public-key signature from the full hash using the public key. The apparatus is further caused to construct the public-key certificate to include at least the public-key signature, the public key, and the partial hash.

According to another embodiment, a computer-readable storage medium carrying one or more sequences of one or more instructions which, when executed by one or more processors, cause an apparatus to receive a request from a mobile device to receive a request from a mobile device to generate a public-key certificate for accessing a service. The apparatus is also caused to initiate transmission of an identity challenge to the mobile device. The apparatus is further caused to receive a tag specific to the mobile device in response to the identity challenge. The apparatus is further caused to calculate a partial hash of the tag. The apparatus is further caused to calculate a full hash of the tag, a predetermined string, and the identity challenge. The apparatus is further caused to retrieve a public-key corresponding to the mobile device. The apparatus is further caused to generate a public-key signature from the full hash using the public key. The apparatus is further caused to construct the public-key certificate to include at least the public-key signature, the public key, and the partial hash.

According to yet another embodiment, an apparatus comprises means for receiving a request from a mobile device to generate a public-key certificate for accessing a service. The apparatus also comprises means for initiating transmission of an identity challenge to the mobile device. The method further comprises receiving a tag specific to the mobile device in response to the identity challenge. The apparatus further comprises means for calculating a partial hash of the tag. The apparatus further comprises means for calculating a full hash of the tag, a predetermined string, and the identity challenge. The apparatus further comprises means for retrieving a public-key corresponding to the mobile device. The apparatus further comprises means for generating a public-key signature from the full hash using the public key. The apparatus further comprises means for constructing the public-key certificate to include at least the public-key signature, the public key, and the partial hash.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

A method and apparatus for authenticating a mobile device are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
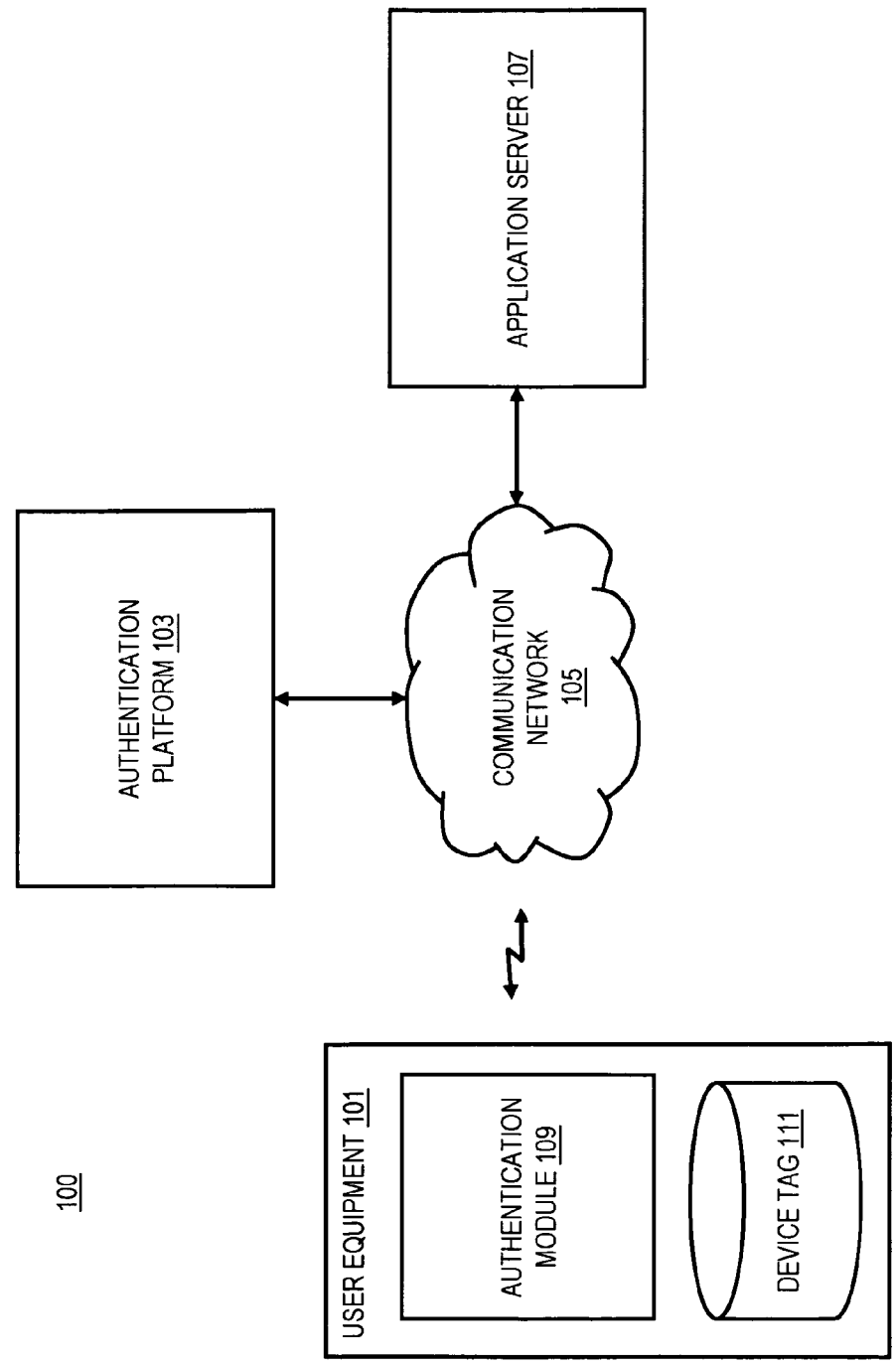
FIG. 1 is a diagram of a communication system capable of authenticating a mobile device, according to one embodiment.

FIG. 1 is a diagram of a communication system capable of optimizing energy consumption for wireless connectivity, according to one embodiment. As previously discussed, service providers, devices manufacturers, and other developers are creating more applications and services that require authentication of either the user or the user's mobile device before accessing the service or application. By way of example, authentication may be required because the service or application handles potentially sensitive information (e.g., E-mail address, phone number, contact information, financial information, payment information, etc.). The service or application, for instance, may request authentication of a user during the service registration process or when a user accesses the service or application. Traditionally, the process of authentication requests that the user enter authentication credentials (e.g., user identification/password, personal information, etc.) for verification.

In some cases, the authentication process also includes the use of a challenge-response test to determine that a request to register for or access a service is generated by a human user and not by automated means (e.g., a computer script). This additional challenge-response test is intended to prevent automated software from accessing services intended to be used by individual users (e.g., polling or voting applications). The challenge-response test can also be used to reduce the potential for messages or postings that originate from automated scripts to be posted in webmail applications, blogs, forums, or other similar services that allow posting of information. One example of a challenge-response test used in this context is the CAPTCHA test (Completely Automated Public Turing test to tell Computers and Humans Apart). More specifically, the CAPTCHA test generates, for instance, a visual challenge typically including a set of symbols and/or letters that are obscured to make it difficult for computer software to automatically recognize and interpret the set of symbols and/or letters, while still being identifiable to a human user. The user then enters a response to the challenge-response test on, for instance, the user's mobile device.

However, it is noted that entering authentication credentials or responses to challenge-responses tests can be quite burdensome, particularly when entering the credentials or responses on the input options available on the mobile device. This increased burden can, in turn, discourage potential users of a service or application that requires authentication from using the particular service or application. Moreover, if the provider or the service or application were to reduce the authentication requirements to make them less burdensome, security of information handled by the service or application could be weakened.

To address the problem of authenticating a mobile device, the system 100 of FIG. 1 introduces the capability of using a tag that is specific to the mobile device to construct a public-key certificate for authenticating access to a service or application. The public-key certificate can then be used to authenticate access to a service or application by the mobile device. As used herein, the term "tag" refers to an identifier or set of identifiers that is unique to the mobile device. In other words, the tag is associated with only one mobile device, and no two mobile devices share the same tag. It is contemplated that the tag may be bound to the mobile device by hardware, software, or a combination thereof. For example, the tag may be a service tag comprising a signature based at least in part on a fixed-form template that binds one or more unique identifiers corresponding to one or more components (e.g., processor- or chip-specific identification or serial number, medium access control (MAC) address, or other similar identification information).

As used herein, the term "public-key certificate" refers to a user's public key signed by a trusted source (e.g., a certification authority (CA)) to verify the authenticity of the public key. The public key, for instance, is used as part of a public-key cryptography system employing an asymmetric approach to cryptography. More specifically, public-key cryptography uses a private key to encrypt messages and a public key to decrypt the message. The private and public keys can be generated from a number or string unique to the mobile device (e.g., the tag discussed above). The private key is kept secret by the user, whereas the public key may be freely distributed (e.g., in a public key database or through direct exchange). In this way, only the user with the private key can encrypt messages that can then be decrypted using the corresponding public key. Therefore, a recipient of a message that can be decrypted by the public key has assurance that the message came from a sender possessing the private key. To transform a public key into a public-key certificate, a trusted source (e.g., the CA) can verify the identity of the user possessing the private to bind that particular user to the private/public key combination. By certifying the public key, the CA also gives confidence to others who trust the CA that the public-key certificate is bound to the a particular user or mobile device, thereby enabling the public-key certificate to, for instance, authenticate a mobile device to access a restricted service or application.

Generally, the service tag discussed above is intended for use by servicing centers to identify the mobile device and its components when the mobile device is sent to the servicing center to be serviced. In one embodiment, the system 100 can use the service tag as a unique identifier to generate the public-key certificate for the mobile device. It is noted that the actual information within the service tag itself (e.g., chip identification number, MAC address, etc.) is not important to the creation of the public-key certificate. It is the uniqueness of the service tag and the binding of the service tag to a particular mobile device that enables the service tag to be used in the system 100. However, using the service tag directly to construct the public-key may unnecessarily expose information in the service tag (e.g., chip identification number, MAC address, etc.) that is potentially sensitive. Accordingly, in certain embodiments, the system 100 employs a partial hash value of the service tag for constructing the public key certificate. In this way, only the partial hash value of the service tag, and not the entire service tag itself, is exposed.

Because service tags and/or applications supporting service tags are already installed in potentially tens of millions of mobile devices currently in use, the system 100 can advantageously provide a public-key certificate to each of these millions of mobile devices to reduce the amount of information a user has to enter on a mobile device to be authenticated to access a service or application. At the same time, the system 100 protects the privacy and integrity of the service tag by not exposing the service tag during the authentication process.

As shown in FIG. 1, a system 100 comprises a user equipment (UE) 101 with connectivity to an authentication platform 103 via a communication network 105. The UE 101 is any type of mobile terminal, fixed terminal, or portable terminal including a mobile handset, station, unit, device, multimedia tablet, Internet node, communicator, desktop computer, laptop computer, Personal Digital Assistant (PDA), or a combination thereof. It is also contemplated that the UE 101 can support any type of interface to the user (such as "wearable" circuitry, etc.). In one embodiment, the authentication platform 103 receives requests from the UE 101 to generate a public-key certificate for authenticating the UE 101 to access a service. In another embodiment, the authentication platform 103 interacts with the application server 107 to generate and validate license files for accessing a service or application on the application server 107 based on the public-key certificate. Although the authentication platform 103 is depicted as a standalone component in the system 100, it is contemplated that the authentication platform 103 may be a component within the application server 107 or another component of the communication network 105. It is contemplated that the application server 107 may support any application that is accessible to the UE 101 over the communication network 105.

By way of example, the communication network 105 includes one or more networks such as a data network (not shown), a wireless network (not shown), a telephony network (not shown), or any combination thereof. It is contemplated that the data network may be any local area network (LAN), metropolitan area network (MAN), wide area network (WAN), the Internet, or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, mobile ad-hoc network (MANET), and the like.

As shown in FIG. 1, the UE 101 includes an authentication module 109 for managing public-key certificates and licenses provided by the authentication platform 103 and/or the application server 107 for accessing a service or application. In one embodiment, the authentication module 109 interacts with the device tag 111 to initiate requests for public key certificates or for authentication to access a service or application. As discussed previously, the device tag 111 stores one or more identifiers specific to the mobile device. One or more of these unique identifiers can then be used to construct a public-key certificate for the UE 101. The public-key certificate, in turn, supports an automated authentication mechanism that reduces the need for the user of the UE 101 to manually provide authentication credentials. In one embodiment, the device tag 111 is a service tag corresponding to the identification information associated with the components (e.g., processor, chip, network interface, etc.) of the UE 101.

By way of example, the UE 101 communicates with the authentication platform 103, the application server 107, and other components of the communication network 105 using standard protocols (e.g., TCP, UDP). For example, the UE 101, the authentication platform 103, and the application server 107 are network nodes with respect to the communication network 105. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
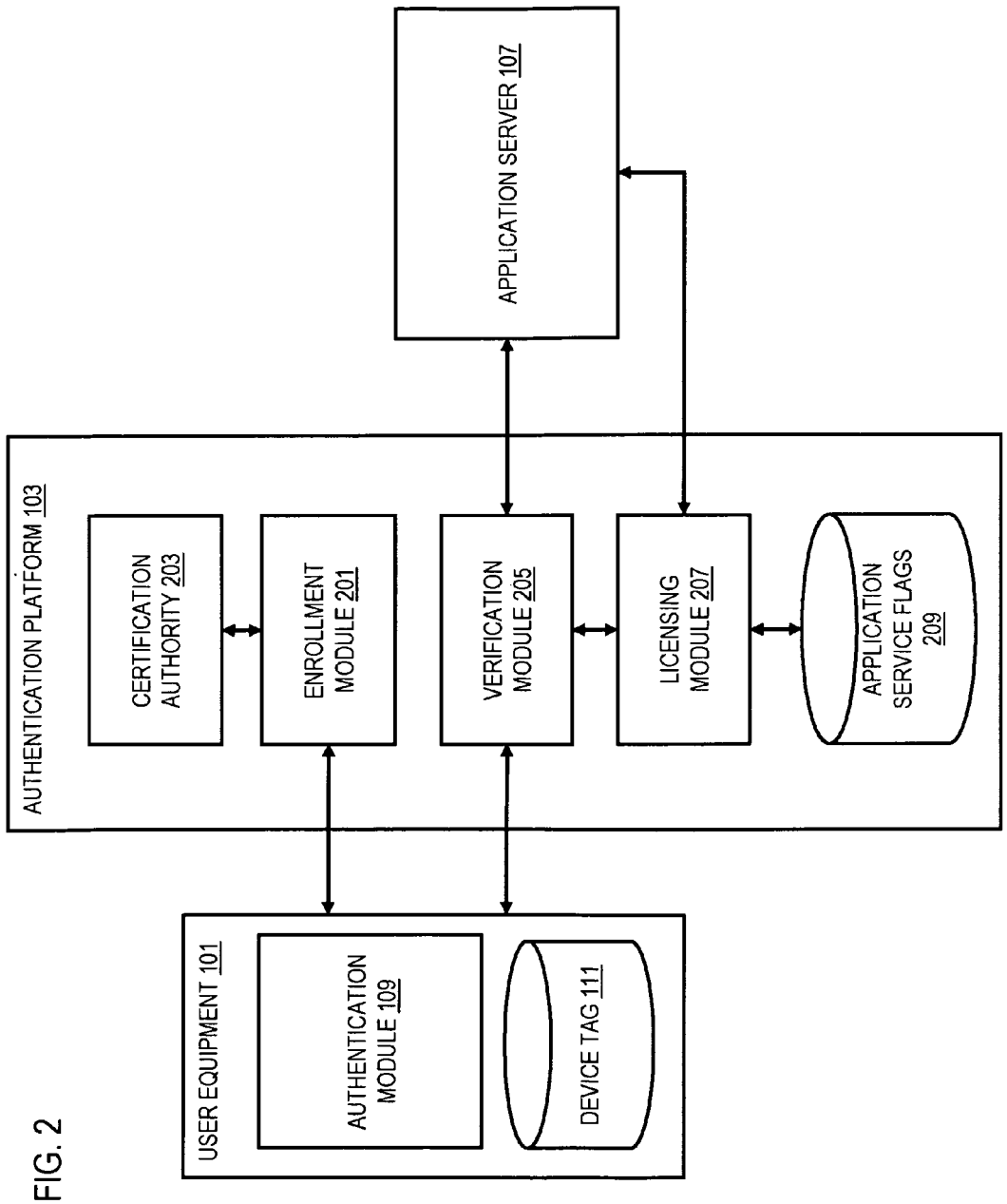
FIG. 2 is a diagram of components of an authentication platform, according to one embodiment.

FIG. 2 is a diagram of components of an authentication platform, according to one embodiment. By way of example, the authentication platform 103 includes one or more components for authenticating the UE 101 to access a service or application. It is contemplated that the functions of these components may be combined in one or more components or performed by other components of equivalent functionality. In this embodiment, the authentication platform 103 includes an enrollment module 201 for receiving a request from the UE 101 to enroll and generate a public-key certificate for accessing a service or application. The request, for instance, may be explicitly made by a user initiating a command, or implicitly made when the user accesses a service or application that requires authentication. For example, a user accesses an online forum using the UE 101. The UE 101 (e.g., the authentication module 109 of the UE 101) does not contain a public-key certificate corresponding to the online forum and automatically initiates a request to generate the public-key certificate.

On receiving the request, the enrollment module 201 interacts with the certification authority (CA) 203 to continue the public-key enrollment process. The CA 203 is a trusted entity that issues public-key certificates for use in public-key cryptography and authentication schemes. More specifically, the CA 203 ensures that the pair of private and public keys used for authentication is matched and verified to correspond to a particular user. In one embodiment, the CA 203 may be a service provider. For example, the service provider may already possess the billing and contact information to verify the identity of a user or mobile device requesting the public-key certificate. It is contemplated that that the CA 203 may be a third party certification authority or any other certification authority trusted to issue public-key certificates. The public key certificate may include, for instance, a name or identifier associated with the mobile device (e.g., the device tag 111 or a partial hash of the device tag 111) and the mobile device's public key. It is contemplated that the device name or identifier may also be a cryptographic signature. The public-key certificate is then signed by the CA 203 to indicate that the public-key certificate has been verified.

By way of example, cryptographically signing a certificate or other data includes applying a hash function (e.g., secure hash algorithm (SHA)) to the certificate or data to generate a corresponding hash value. The hash function, for instance, takes data of varying length and generates a fixed-sized bit string. The fixed-sized bit string is the hash value. Applying the hash function to only a portion of the data can also generate a partial hash value. The hash value is then encrypted using, for instance, a private key associated with the UE 101 to generate the signature. The signature along with the public-key certificate is attached to the data to create the cryptographically signed data.

As discussed previously, the device tag 111 can be a service tag associated with the UE 101. In one embodiment, the device tag 111 is the basis of the device specific signature because the device tag 111 is unique to each UE 101. For example, the service tag is often included by the device manufacture in many mobile devices and is intended to positively identify the UE 101 and its component parts (chips, processor, etc.) when brought in for servicing. Because the service tag is unique to each UE 101, the service tag is applicable for use as a unique identifier from which to construct the public-key certificate for the device. However, as noted earlier, the service tag includes potentially sensitive information (e.g., MAC address, chip identification) that is not relevant to its use in constructing a public-key certificate. Accordingly, in one embodiment, the information contained in the service tag is obscured using a hash function (e.g., SHA) to generate a partial hash value from the service tag. As used herein, a partial hash value is calculated by applying the hash function to only a portion (e.g., a predetermined set of fields) of the service tag information. Consequently, the partial hash does not expose the sensitive information in the service tag to either the verification server or to a potential network eavesdropper. Even if the eavesdropper were to intercept the certificate or signature, the eavesdropper would receive only the partial hash value. In addition, to distinguish the use of the service tag for generating a public-key for accessing services rather than for phone servicing operations (e.g., the use for which the service tag was originally intended), the CA 203 appends a fixed string (e.g., any fixed string configured by the CA 203) to the service tag information before calculating the partial hash value. The fixed string makes the service tag signature used for generating the public-key certificate uniquely distinguishable from any signature that might be used as part of phone servicing operations.

In one embodiment, the public-key certificate is an X.509 certificate (as defined in RFC 5280, "Internet X.509 Public Key Infrastructure Certificate and Certificate Revocation List (CRL) Profile," The Internet Engineering Task Force, May 2008, incorporated herein by reference in its entirety) with the several additions. By way of example, the structure of an X.509 certificate includes the following sections: (1) Version—identifying the version of the X.509 standard used for the certificate, e.g., Version 3 or Version 2; (2) Serial Number—a unique identifier assigned by the CA 203; (3) Algorithm Identifier—identifies the signature algorithm used by the CA 203 to sign the certificate including any parameters required for the algorithm; (4) Issuer—identifies the CA 203 signing and issuing the certificate; (5) Period of validity—specifies the time period during which the CA 203 will maintain information about the status of the certificate represented, e.g., by a date on which the validity period begins and a date on which the validity period ends; (6) Subject—identifies the entity associated with the public key provided by the certificate; (7) Subject's Public Key—specifies the public key and the cryptographic algorithm used on the public key, e.g., ElGamal, RSA, Digital Signature Algorithm (DSA), Diffie-Hoffman, etc.; and (8) Signature—provides the signature of the CA 203 encrypted using the algorithm of specified in item 3.

In one embodiment, the CA 203 of the authentication platform 103 makes the following additions to the standard X.509 certificate: (1) a public key, e.g., derived from the device tag 111, encrypted using ElGamal encryption, and specified in abstract syntax notation one (ASN.1) format (as defined in X.680, "Information Technology—Abstract Syntax Notation One (ASN.1): Specification of Basic Notation," International Telecommunication Union, July 2002, incorporated herein by reference in its entirety); (2) a new extension specifying and conveying the hash state (e.g., partial hash value) of the device tag 111 as well as the algorithm (e.g., secure hash algorithm (SHA)) and associated parameters for generating the partial hash value; and (3) two new object identifiers (OIDs) corresponding respectively to the public key and the hash state of the device tag 111.

In certain embodiments, the device tag 111 and/or the public-key certificate may be bound to identifiers that are unique to the UE 101 such as an International Mobile Equipment Identity (IMEI) code, Medium Access Control (MAC) address, International Mobile Subscriber Identity (IMSI) code, Electronic Serial Number (ESN), Mobile Equipment Identifier (MEID), International Mobile Subscriber, chip specific identifier, or a combination thereof It is also contemplated that the device tag 111 and/or public-key certificate may bind individual users to the device by linking a user identity. The user identity may correspond to a service or application that is being accessed. For example, if the service is an application store (e.g., Nokia's Ovi Store), the certificate may be bound to a user by the user's Ovi login credentials. Similarly, login credentials corresponding to banks or other secure services may be linked to the public-key certificate corresponding to the service. In this way, authentication platform 103 may grant access to not only a specific service or application, but also to the specific account within the service or application.

As shown in FIG. 2, the authentication platform 103 also includes a verification module 205 for verifying previously enrolled public key certificates and granting access or licenses to access one or more services and applications provided by the application server 107. For example, the verification module 205 may initiate verification of a public-key certificate when the UE 101 requests access to a service or application requiring authentication. In one embodiment, verification includes comparing a signature that is derived by the UE 101 from the device tag 111 against the identification information (e.g., partial hash value) and public key contained in the public-key certificate. For example, the verification module 205 may decrypt the signature using the public key to obtain a hash value from the signature for comparison against the hash value contained in the public-key certificate.

Based on the verification, the verification module 205 interacts, for instance, with the licensing module 207 to grant the UE 101 access to the requested service or application. By way of example, the licensing module 207 creates a license file that contains the license and identifies the corresponding service or application. In some embodiments, the license file may also include a certificate corresponding to the licensing module 207 as well as the public-key certificate from the UE 101. The license file may be stored by the UE 101 for accessing the corresponding service or application at a later time. It is contemplated that a license file may contain one or more individual licenses corresponding respectively to one or more services or applications. In certain embodiments, the licensing module 207 can also split license files that contain multiple licenses into individual license files so that each file contains only one license. Additionally, the licensing module 207 can operate in the opposite mode and combine individual license files into one combined license file. The determination of whether to split or combine license files can be specified by the user, the corresponding application, service provider, application provider, and/or other similar parties. In one embodiment, the license file is an extensible markup language (XML) file.

In addition or alternatively, the licensing module 207 may set one or more service flags corresponding to the requested service or application to indicate that the corresponding UE 101 has a license to access to a particular service or application. For example, the authentication platform 103 maintains a database 209 of application service flags to store service information corresponding to each UE 101 that has been granted a license to access a service or application provided by the application server 107. In this way, the UE 101 need not present a license file to access the service or application after initial verification of the public-key certificate and creation of the license file. Instead, the authentication platform 103 consults the application service flags database 209 to determine whether a particular UE 101 has a license. In one embodiment, the application service flags database 209 includes information on the time periods during which each license file is valid. The flags can then be automatically updated to reflect whether a license is valid based on the date.

Figure 3:
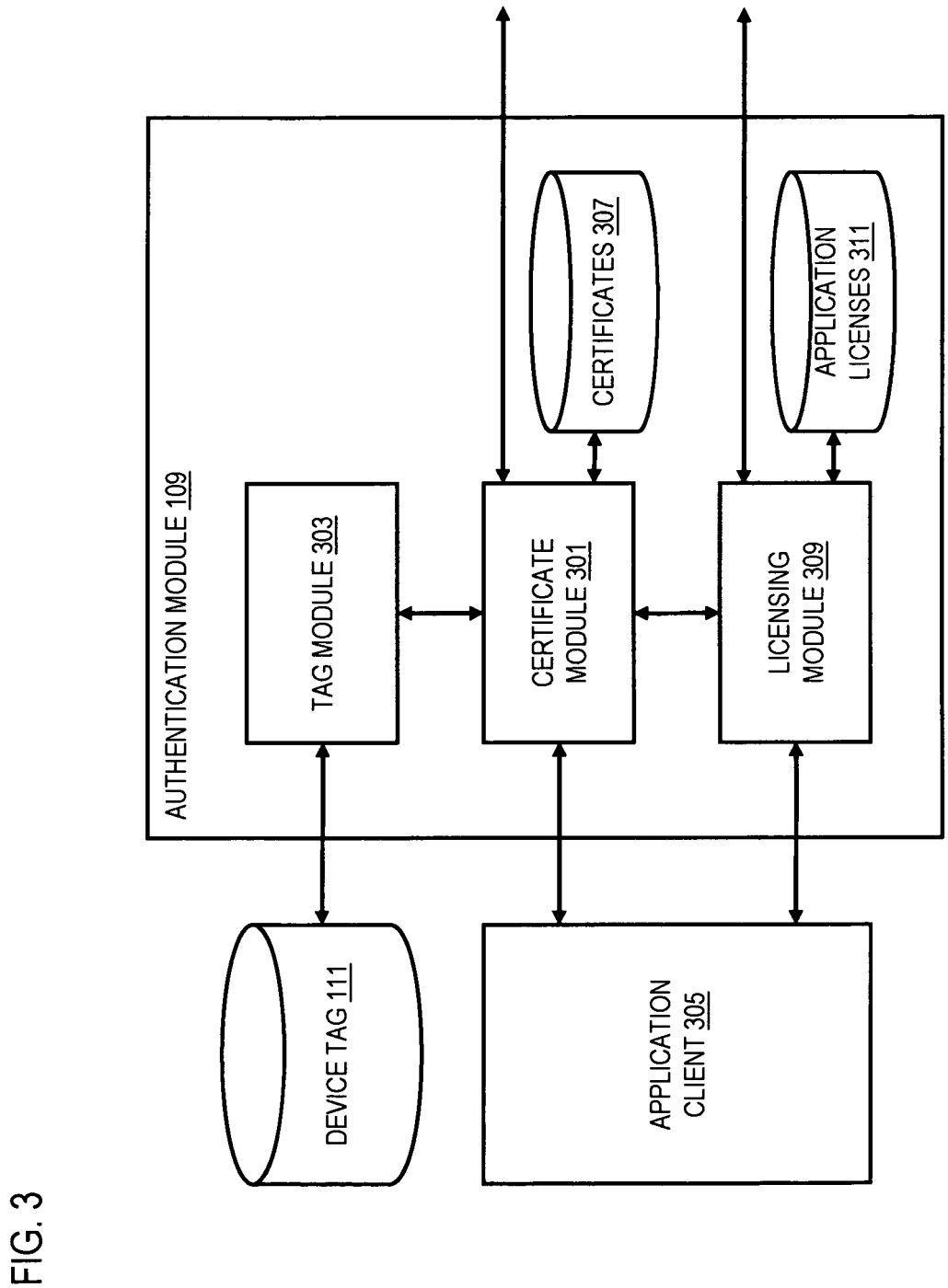
FIG. 3 is a diagram of components of an authentication module, according to one embodiment.

FIG. 3 is a diagram of components of an authentication module, according to one embodiment. In one embodiment, the authentication module 109 is the corresponding client to the authentication platform 103 and includes one or more components for authenticating the UE 101 to access a service or application. It is contemplated that the functions of these components may be combined in one or more components or performed by other components of equivalent functionality. In this embodiment, the authentication module 109 includes a certificate module 301 for coordinating requests to generate and enroll public-key certificates with the authentication platform 103. For example, as discussed with respect to FIG. 2, a request to enroll a public-key certificate may be initiated with the UE 101 attempts to access a service or application requiring authentication. In one embodiment, the accessing a service or application occurs via an application client 305 running on, for instance, the UE 101. The application client 305 can, for instance, direct the certificate module 301 to obtain one or more public-key certificates from the authentication platform 103 to enable access to the corresponding service or application on the application server 107.

To initiate enrollment of a certificate, the certificate module 301 interacts with the tag module 303 to obtain a device specific tag (e.g., the device tag 111) for generating the public-key certificate. As discussed previously, the device tag 111 forms the basis of device signature included in the public-key certificate. In one embodiment, the tag module 303 operates within a security envelope of the UE 101 to enable access to the device tag 111 (e.g., a service tag). The security envelope provides a secure environment (e.g., Nokia's Base Band 5 (BB5) system) for handling protected information (e.g., the device tag 111) within the UE 101. Moreover, processes and components located outside of the secure environment do not have direct access to the information or processes within the environment. In other words, the tag module 105 operates with an embedded trusted environment of the UE 101. This embedded environment has, for instance, its own associated public and private keys for authentication and encryption. The certificate module 301 then forwards the device tag 111 to the authentication platform 103 for generating and enrolling the certificate.

As shown in FIG. 3, the certificate module 301 also has connectivity to a database 307 of certificates for storing public-key certificates enrolled with the authentication platform 103. It is contemplated that the enrolled public-key certificates need not be stored in the database 307 and may be stored in any network component (e.g., the authentication platform 103, the application server 107, etc.). After enrolling one or more public-key certificates, the certificate module 301 can interact with the licensing module 309 to obtain licenses for accessing one or more services or applications using the enrolled public-key certificates. As described with respect to FIG. 2, the licenses are provided in one or more license files that can be stored in database 311 of application licenses. The stored license files can then be used for future access to the corresponding services or applications. For example, the application client 305 can access the appropriate license file in the application licenses database 311 to authenticate access to a service or application.

Figure 4:
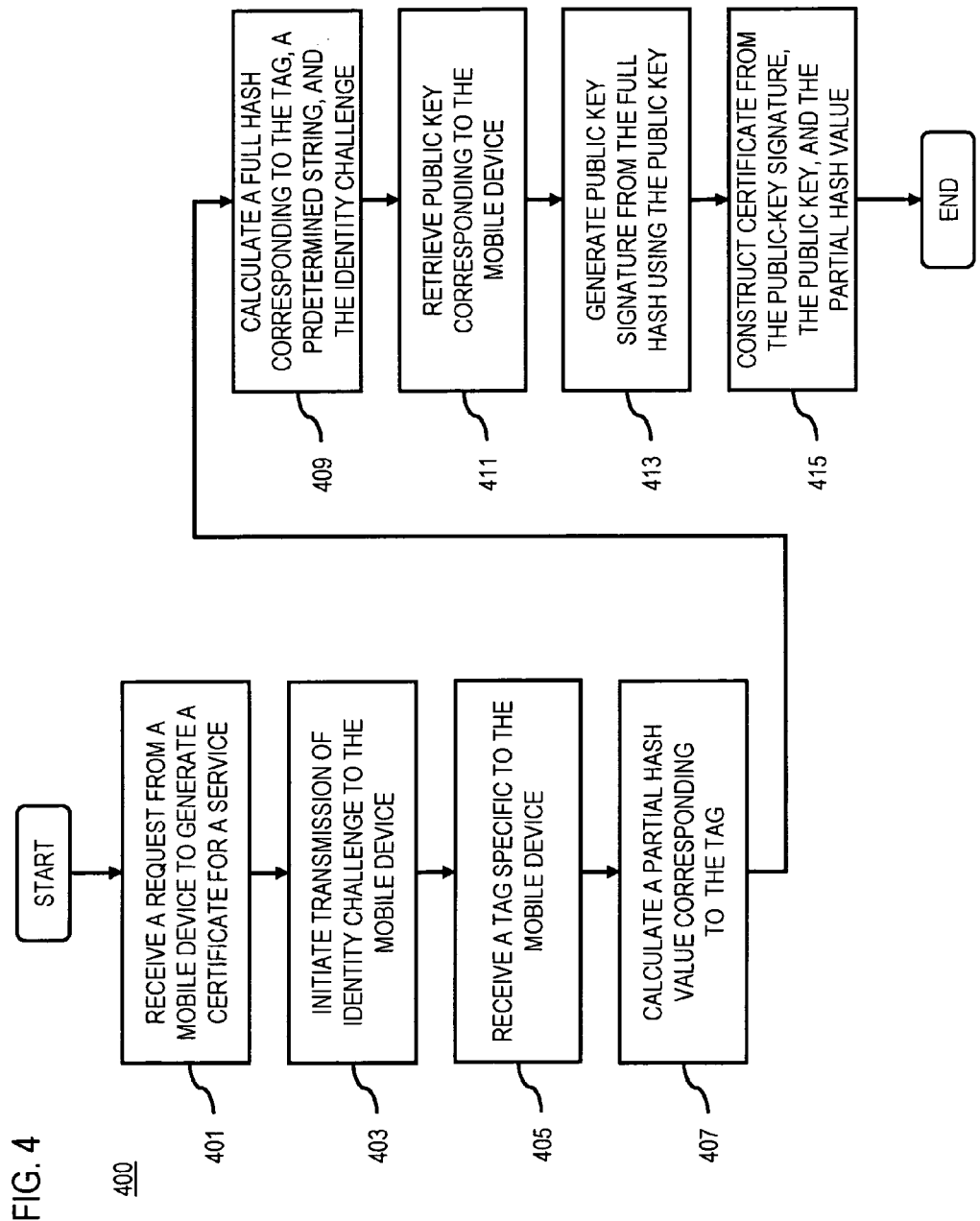
FIG. 4 is a flowchart of a process for enrolling a certificate for authenticating a mobile device, according to one embodiment.
Figure 9:
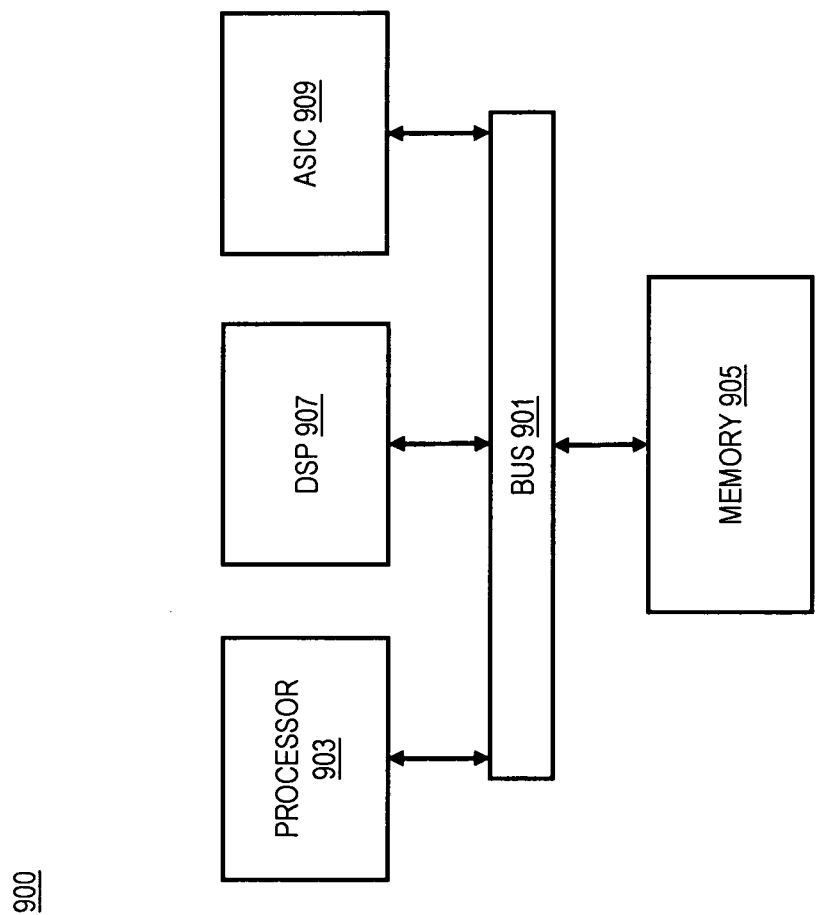
FIG. 9 is a diagram of a chip set that can be used to implement an embodiment of the invention.

FIG. 4 is a flowchart of a process for enrolling a certificate for authenticating a mobile device, according to one embodiment. In one embodiment, the authentication platform 103 performs the process 400 and is implemented in, for instance, a chip set including a processor and a memory as shown in FIG. 9. In step 401, the authentication platform 103 receives a request from the UE 101 to generate and enroll a public-key certificate for accessing a service or application. For example, the request may be made at the time the UE 101 seeks to access the service or application. The request may also be made in advance, e.g., prior to when the UE 101 seeks to access the service or application. In response to the request, the authentication platform 103 initiates transmission of an identity challenge to the UE 101 (step 403). The identity challenge, for instance, seeks to verify the identity of the UE 101 or a user associated with the UE 101 by verifying identification information known by both the authentication platform 103 and the UE 101. This information may include personal and/or account information previously provided to, for instance, the service provider or other third party (e.g., financial institution, public databases, etc.). It is contemplated that any identity challenge sufficient to confirm the identity of the UE 101 or the user associated with the UE 101 can be used.

In the example embodiment, the authentication platform 103 receives a response to the identity challenge including the device tag 111 corresponding to the UE 101 for generating and enrolling the requested public-key certificate (step 405). The device tag 111, for instance, is received over a secure transmission mechanism (e.g., encryption using the ElGamal encryption algorithm) to reduce potential exposure of the tag. In one embodiment, the device tag 111 is provided only during the public-key certificate enrollment process to reduce the risk of exposure of the device tag 111. Additionally, the device tag 111 can be a service tag comprising a signature based at least in part on a fixed-form template that binds one or more unique identifiers corresponding to one or more components (e.g., processor, chip, network interface) of the UEE 101 into the signature. By way of example, the unique identifiers include an International Mobile Equipment Identity (IMEI) code, Medium Access Control (MAC) address, Bluetooth address (BTADDR), International Mobile Subscriber Identity (IMSI) code, Electronic Serial Number (ESN), Mobile Equipment Identifier (MEID), International Mobile Subscriber, chip specific identifier, or a combination thereof.

In one embodiment, the public-key certificate includes at least a public-key signature based in part on the device tag 111 (e.g., a hash of the device tag 111, a predetermined string, and the identity challenge). Accordingly, to initiate the certificate generation process, the authentication platform 103 calculates a partial hash value from the tag (step 407), e.g., for inclusion in the public-key certificate and generation of the public-key signature. As discussed previously, the use of a partial hash value prevents exposure of potentially sensitive information contained in the device tag 111. For example, the partial hash value is calculated using a portion of the multiple fields comprising the fixed-form template and is processed using, for instance, a secure hash algorithm (SHA).

Another component of the public-key certificate is the public-key signature. By way of example, the public key signature is generated by calculating a full hash corresponding to the tag, a predetermined string, and the identity challenge and then encrypting the hash. Accordingly, the authentication platform 103 completes the partial hash of the device tag 111 by appending a hash of a predetermined or fixed string and the identity challenge or an identifier associated with the identity challenge (step 411). For example, cryptographic hash functions (e.g., SHA) typically are designed to allow addition of data elements or blocks even after the function has been performed on an initial block of data. The fixed string may be a general identifier such as "ServiceSignature." Alternatively, the string may be specific to a particular service such as the Nokia Ovi Store (e.g., "OviSignature"). It is contemplated that the authentication platform 103 can use any fixed string to append to the partial hash value.

Next, the authentication platform 103 retrieves a public key corresponding to the UE 101 (step 411). For example, if the UE 101 signed the device tag 111 using the UE 101's public key, the authentication platform 103 can extract the public key from the device tag 111. In addition or alternatively, the authentication platform 103 can obtain the public key corresponding to the UE 101 from a centrally stored location such as a key database or similar. In other embodiments, the authentication platform 103 can generate the public key from the device tag 111 by using a key generator. Once the authentication platform 103 has derived or otherwise obtained the public key, the platform 103 generates the public-key signature by, for instance, signing and/or encrypting the full hash generated above using the retrieved public key (step 413). The authentication platform 103 then constructs the public-key certificate to include the public-key signature, the public key, and the partial hash (step 415). As part of the construction process, the authentication platform 103 also signs the public-key certificate to verify the public-key certificate is from a trusted source (e.g., CA 203). Depending on the intended use of the public-key certificate, the authentication platform 103 may also bind the UE 101 to the identity of the user associated with the UE 101 using, for instance, a user login associated with the requested service or application (e.g., application store, online banking, online commerce, etc.). After generating the public-key certificate, the authentication platform 103 may store the enrolled public-key certificate any in available network component (e.g., database 307 of the UE 101, the application server 107, or the authentication platform 103 itself).

Figure 5:
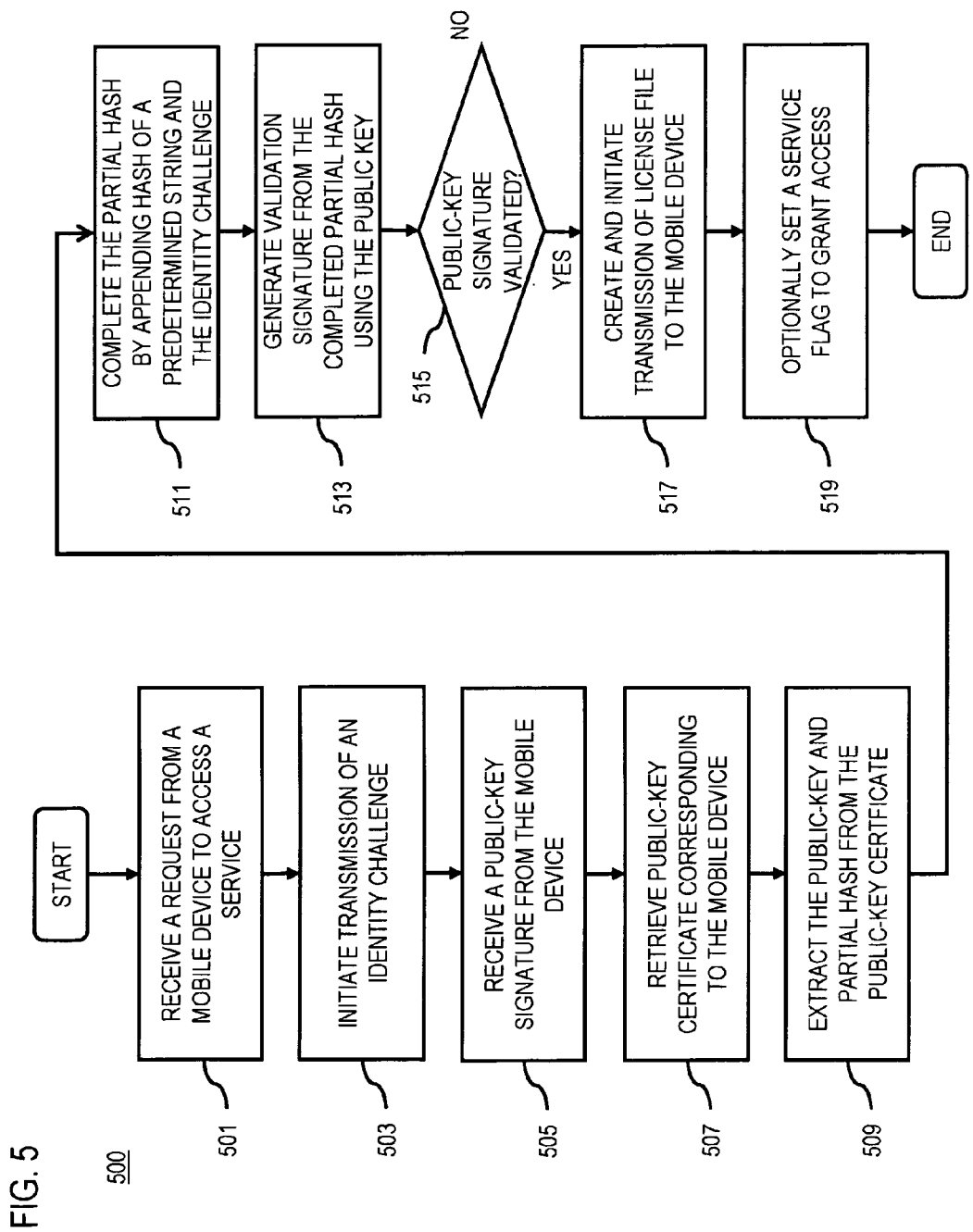
FIG. 5 is a flowchart of a process for authenticating a mobile device to access a service, according to one embodiment.

FIG. 5 is a flowchart of a process for authenticating a mobile device to access a service, according to one embodiment. In one embodiment, the authentication platform 103 performs the process 500 and is implemented in, for instance, a chip set including a processor and a memory as shown in FIG. 9. The process 500 assumes that the authentication platform 103 has already enrolled the public-key certificate as described with respect to FIG. 4. In step 501, the authentication platform 103 receives a request from the UE 101 to access a service or application. As with the public-key certificate enrollment process of FIG. 4, the authentication platform 103 responds to the request by initiating an identity challenge to the UE 101 (step 503). This identity challenge seeks to obtain a public-key signature from the UE 101 for validation. It is contemplated that, in certain embodiments, the identity challenge may be initiated implicitly according to predetermined time intervals. For example, the identity challenge may be initiated as part of a beacon signal to periodically challenge and confirm the identity of the UE 101. In this way, the platform 103 provides a higher level of security without requiring the user to take active steps to verify identity.

In response to the identity challenge, the authentication platform 103, for instance, receives a public-key signature from the UE 101. In one embodiment, the public-key signature is calculated by the UE 101 from a hash of the device tag 111, the predetermined string, and the identity challenge (step 505). The public-key signature can then be verified against the information contained in the corresponding enrolled public-key certificate. To conduct the validation, the authentication platform 103 retrieves the public-key certificate corresponding to the UE 101 (step 507). For example, the platform 103 may obtain the public-key certificate from a public depository or database, from the UE 101 (e.g., database 307), from another component of the system 100.

After obtaining the certificate, the authentication platform 103 extracts the public-key and the partial hash from the certificate (step 509). The platform 103 can then complete the partial hash obtained from the certificate by, for instance, generating a hash of the predetermined string and the identity challenge and appending the hash to the partial hash (step 511). Next, the platform 103 generates a validation signature from the completed hash by encrypting the hash using the public key corresponding to the requesting UE 101 (step 513). In one embodiment, the generated validation signature is compared against the public-key signature obtained from the public-key certificate to validate the signature provided by the UE 101 (step 515). If the two signatures match, the authentication platform 103 creates and initiates transmission of a license file corresponding to the requested service or application (step 517). In one embodiment, the license file enables the UE 101 to access the service or application for as long as the license file is valid. Optionally, the authentication platform 103 may also set one or more service flags corresponding to the service or application to grant the UE 101 future access to the service or application without having to revalidate the public-key certificate or the license file (step 519).

In one embodiment, the authentication and validation process described with respect to FIG. 5 can be used as a replacement for the CAPTCHA system to inhibit automatic and/or mass deployment of network identities by computer scripts or other automated means. As discussed previously, the CAPTCHA prevents automated use or deployment of network identities in protected application by using a challenge/response system (e.g., in this case a visually-based challenge system) that is difficult for automated software to defeat. The authentication mechanism described herein share the same property of being difficult to defeat via software because the device tag 111 and corresponding authentication applications operate within an embedded trusted environment (e.g., BB5) in the UE 101 as described with respect to FIG. 3. Therefore, applications protected by authentication mechanism of system 100 have a relatively high degree of protection against potential spoofing or copying of the device tag 111 that would be used to defeat the authentication mechanism. In addition, because each device and corresponding service tag 111 can be individually identified, the application servers monitor when any one device is being used to generate multiple network identities. The servers can then reduce or throttle back the privileges of the offending device or devices to reduce the potential for spamming or overwhelming applications and services using automated or mass attacks.

Figure 6:
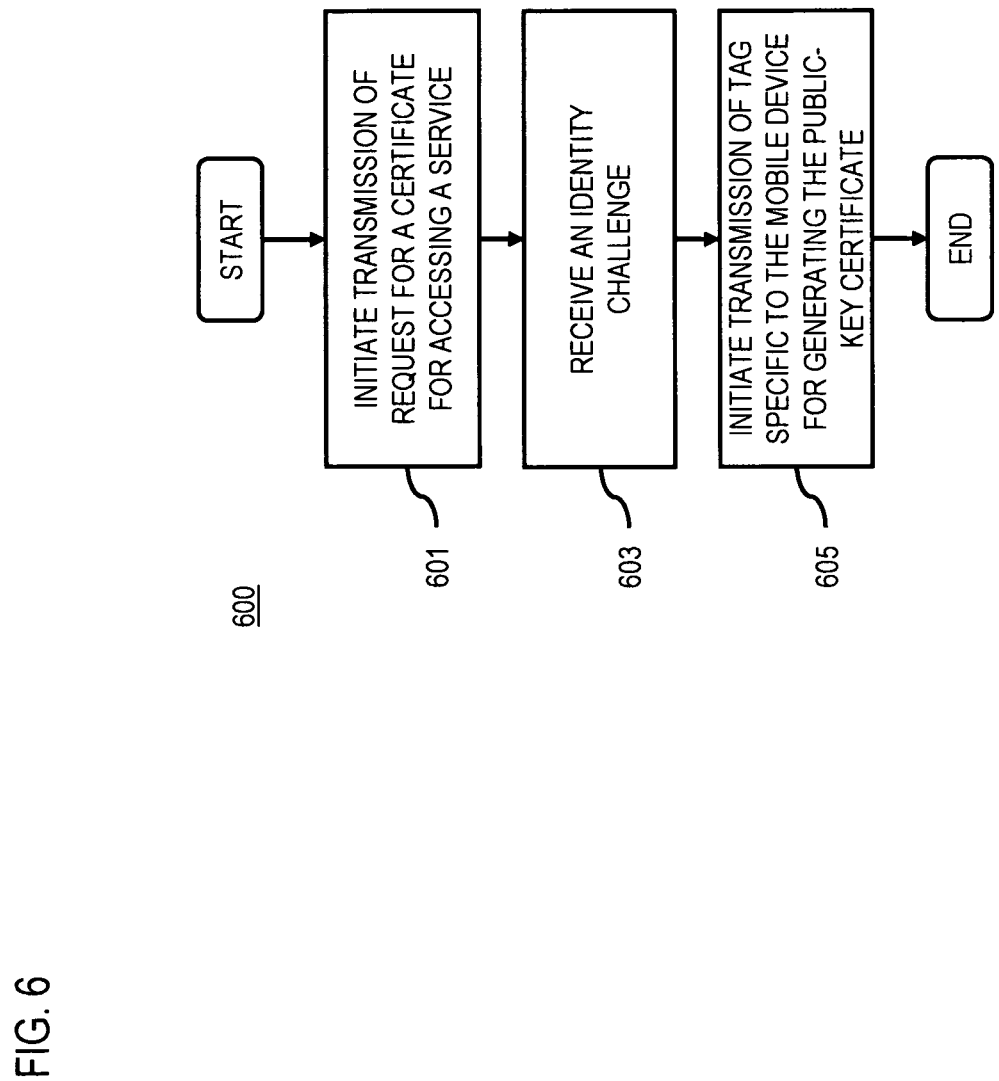
FIG. 6 is a flowchart of a process for initiating enrollment of a certificate for authenticating a mobile device, according to one embodiment.

FIG. 6 is a flowchart of a process for initiating enrollment of a certificate for authenticating a mobile device, according to one embodiment. In one embodiment, the authentication module 109 performs the process 600 and is implemented in, for instance, a chip set including a processor and a memory as shown in FIG. 9. In step 601, the authentication module 109 initiates transmission of a request to generate a public-key certificate for accessing a service or application. The request, for instance, is directed to the authentication platform 103 for accessing a service or application provided by the application server 107. The use of a public-key certificate for authenticating access to a service reduces the need for manual entry authentication credentials on the UE 101, thereby decreasing the burden of accessing services that require authentication from a mobile device.

After transmitting the request for a public-key certificate, the authentication module 109 receives an identity challenge from the authentication platform to verify the identity of the corresponding UE 101 or the user associated with the UE 101 (step 603). As discussed with respect to FIG. 4, the identity challenge may request any information to sufficiently identify the UE 101 or user requesting the public-key certificate. In one embodiment, the authentication module 109 includes, as part of its response to the identity challenge, the device tag 111 to facilitate generation of the public-key certificate (step 605). The authentication module 109 transmits the device tag 111 in a manner that protects the confidentiality of the information (e.g., using an ElGamal encryption algorithm or other similar cryptographic algorithm). The authentication platform 103 then uses the information to generate the public key certificate as described with respect to FIG. 4.

Figure 7:
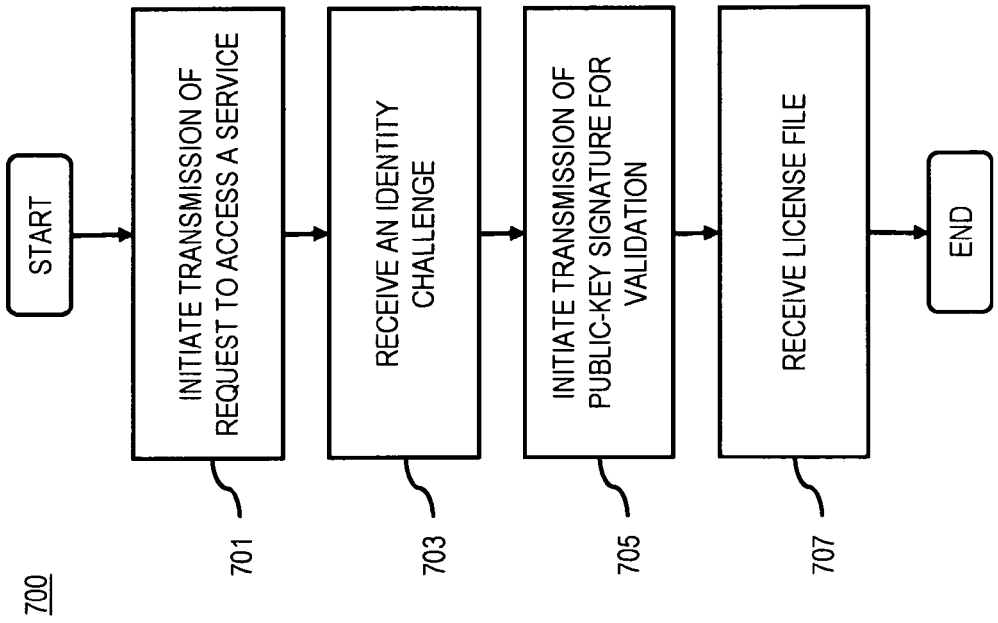
FIG. 7 is a flowchart of a process for requesting authentication of a mobile device to access a service, according to one embodiment.

FIG. 7 is a flowchart of a process for requesting authentication of a mobile device to access a service, according to one embodiment. In one embodiment, the authentication module 109 performs the process 700 and is implemented in, for instance, a chip set including a processor and a memory as shown in FIG. 9. The process 700 assumes that the authentication module 109 has already requested and received the public-key certificate as described with respect to FIG. 6. In step 701, the authentication module 109 initiates transmission of a request to access a service or application using a previously enrolled public-key certificate. The request is transmitted to the authentication platform 103 for processing. If no public-key certificate has been previously enrolled, the authentication platform 103 may, for example, ask the authentication module 109 to provide authentication credentials using alternate means (e.g., user identification/password, CAPTCHA, etc.). Otherwise, the authentication module 109 receives an identity challenge from the authentication platform 103 (step 703). The identity challenge includes, for instance, a request for a public-key signature from the authentication module 109. In one embodiment, the authentication module 109 generates the public-key signature from a hash of the device tag 111, the predetermined string, and the identity challenge or identifier associated with the identity challenge. The module 109 then initiates transmission of the public-key signature to, for instance, the authentication platform 103 for validation (step 705).

Once the public-key signature is validated per the process as described with respect to FIG. 5, the authentication module 109 receives a license file from the authentication platform 103 granting access to the service or application (step 707). The authentication platform 103 may also grant access to a service by setting service flags to indicate that the UE 101 has a valid license to access the corresponding service or application. In this way, the UE 101 need not present its public-key certificate or license file to access a particular service or application so long as the corresponding license remains valid.

The processes described herein for providing authenticating a mobile device may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
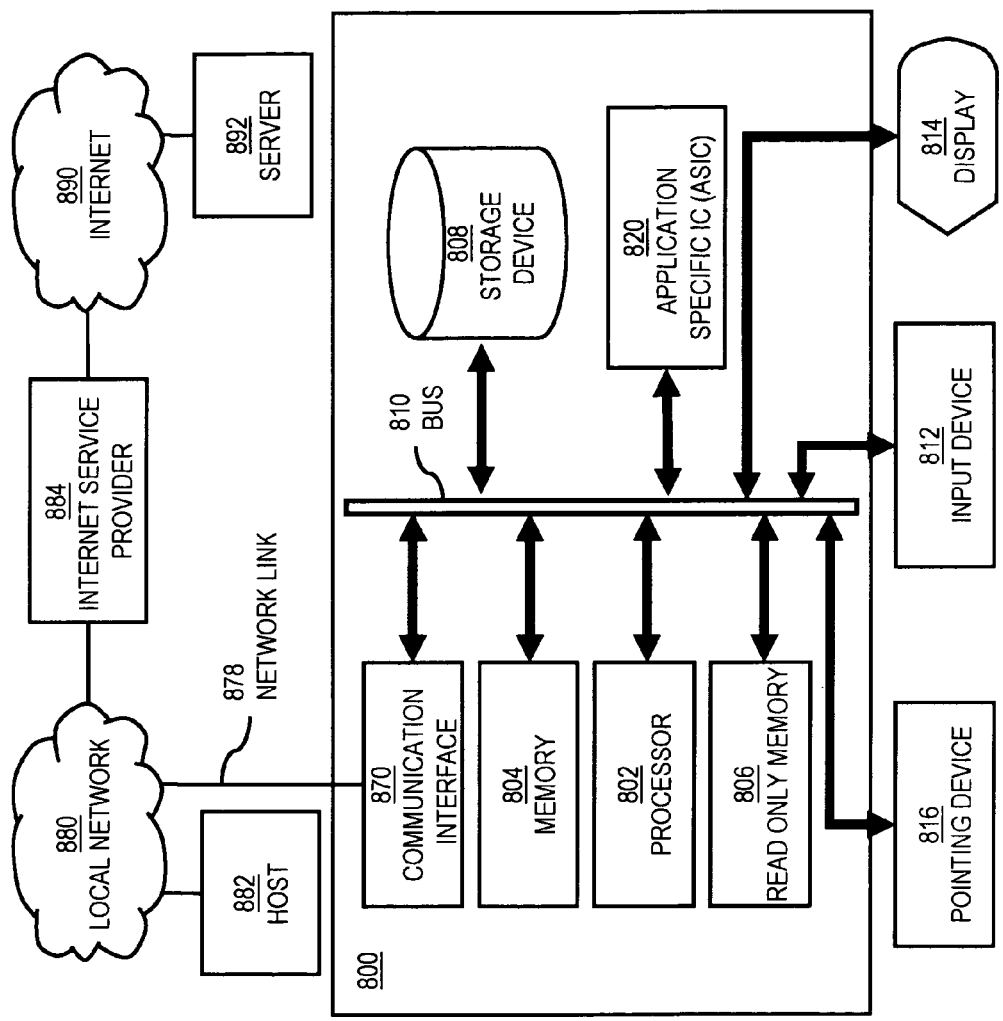
FIG. 8 is a diagram of hardware that can be used to implement an embodiment of the invention.

FIG. 8 illustrates a computer system 800 upon which an embodiment of the invention may be implemented. Computer system 800 is programmed (e.g., via computer program code or instructions) to authenticate a mobile device as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 810 includes one or more parallel conductors of information so that information is transferred quickly among devices coupled to the bus 810. One or more processors 802 for processing information are coupled with the bus 810.

A processor 802 performs a set of operations on information as specified by computer program code related to authenticate a mobile device. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions for authenticating a mobile device. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for authenticating a mobile device, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for authenticating a mobile device.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

FIG. 9 illustrates a chip set 900 upon which an embodiment of the invention may be implemented. Chip set 900 is programmed to authenticate a mobile device as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to authenticate a mobile device. The memory 905 also stores the data associated with or generated by the execution of the inventive steps.

Figure 10:
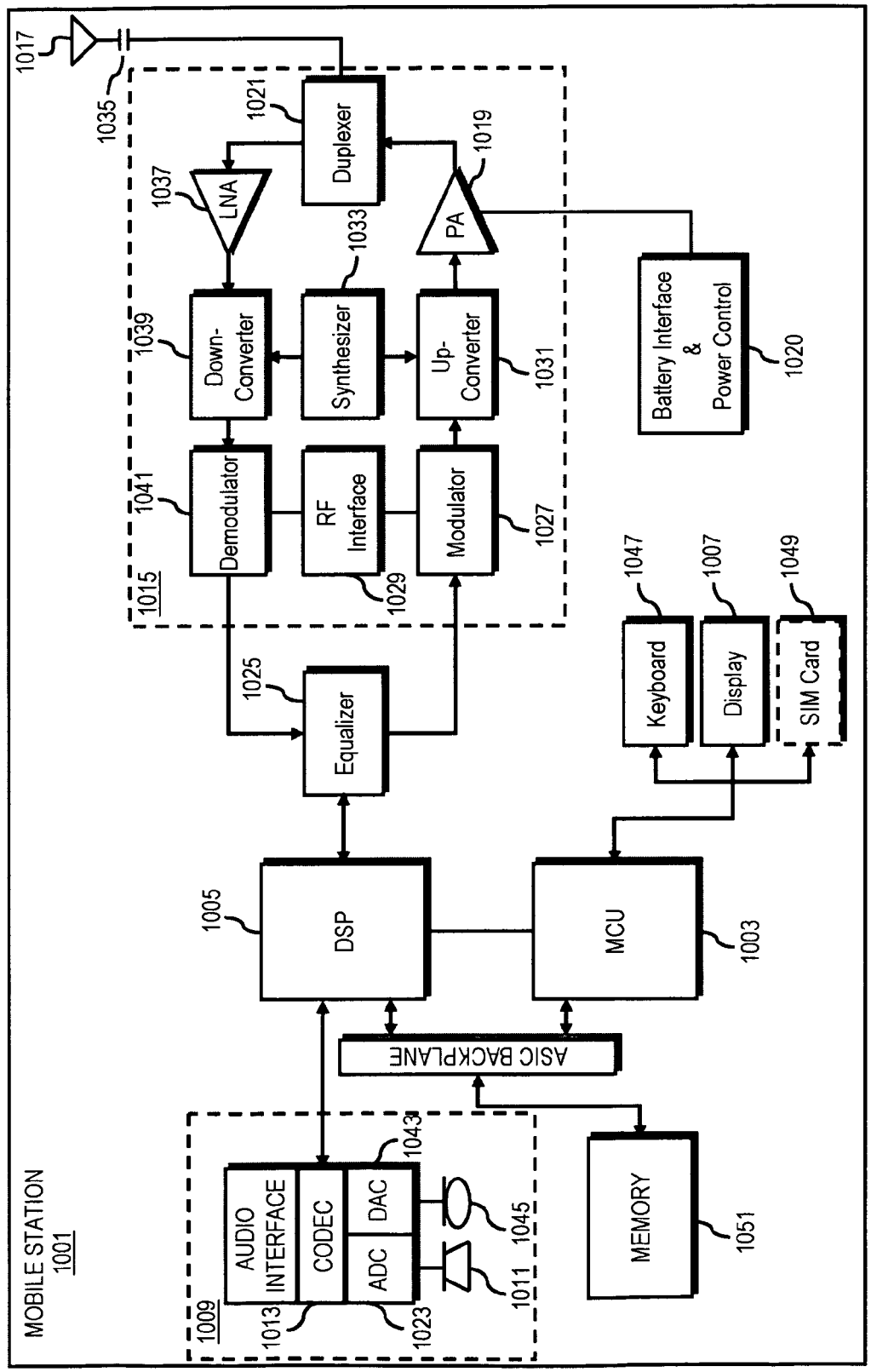
FIG. 10 is a diagram of a mobile station (e.g., handset) that can be used to implement an embodiment of the invention.

FIG. 10 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile station functions that offer automatic contact matching. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile station 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile station 1001 to authenticate a mobile device. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the station. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile station 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile station 1001 on a radio network. The card 1049 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    initiating transmission, from a mobile device, of a request to an authentication platform, different from the mobile device, for generating a public-key certificate to access a service from the mobile device;
    receiving, by the mobile device, an identity challenge, initiated from the authentication platform, corresponding to the request; and
    initiating transmission of a tag specific to the mobile device to the authentication platform,
    wherein the tag is used by the authentication platform to generate the public-key certificate, and
    wherein the public-key certificate includes at least a public-key signature based in part on the tag, a public key corresponding to the mobile device, and a partial hash calculated over the tag.

2. A method of claim 1, wherein the tag is a service tag based on at least a portion of a fixed-form template including one or more unique identifiers corresponding to the mobile device, and wherein the one or more identifiers include an International Mobile Equipment Identity (IMEI) code, Medium Access Control (MAC) address, Bluetooth address (BTADDR), International Mobile Subscriber Identity (IMSI) code, Electronic Serial Number (ESN), Mobile Equipment Identifier (MEID), International Mobile Subscriber, chip specific identifier, or a combination thereof.

3. A method comprising:
    initiating transmission, from a mobile device, of a request to an authentication platform, different from the mobile device, for generating a public-key certificate to access a service from the mobile device;
    receiving, by the mobile device, an identity challenge, initiated from the authentication platform, corresponding to the request;
    initiating transmission of a tag specific to the mobile device to the authentication platform, wherein the tag is used by the authentication platform to generate the public-key certificate;
    initiating transmission of another request to access the service;
    receiving another identity challenge in response to the other request;
    generating, in response to the other identity challenge, a public-key signature calculated from a hash of the tag, a predetermined string, and the other identity challenge;

initiating transmission of the public-key signature to the authentication platform for validation; and receiving a license file granting access to the service based on the validation.

4. A method of claim 3, wherein the step of generating in response to the other identity challenge is performed by an embedded trusted environment within the mobile device, and wherein the public key signature is signed with a public key corresponding to the embedded trusted environment.

5. A method of claim 3, wherein the validation is used to inhibit automatic or mass deployment of network identities.

6. An apparatus comprising:
at least one processor; and
at least one memory including computer program code,
the at least one memory and the computer program code configured to, with the at least one processor, cause the apparatus to perform at least the following,
initiate transmission, from a mobile device, of a request to an authentication platform, different from the mobile device, for generating a public-key certificate to access a service from the mobile device,
receive at the mobile device, an identity challenge from the authentication platform corresponding to the request,
initiate transmission of a tag specific to the mobile device to the authentication platform, wherein the tag is used by the authentication platform to generate the public-key certificate,
initiate transmission of another request to access the service,
receive another identity challenge in response to the other request,
generate, in response to the other identity challenge, a public-key signature calculated from a hash of the tag, a predetermined string, and the other identity challenge,
initiate transmission of the public-key signature to the authentication platform for validation, and
receive a license file granting access to the service based on the validation.

7. An apparatus of claim 6, wherein the step of generating in response to the other identity challenge is performed by an embedded trusted environment within the mobile device, and wherein the public key signature is signed with a public key corresponding to the embedded trusted environment.

8. An apparatus of claim 6, wherein the tag is a service tag based on at least a portion of a fixed-form template including one or more unique identifiers corresponding to the mobile device, and wherein the one or more identifiers include an International Mobile Equipment Identity (IMEI) code, Medium Access Control (MAC) address, Bluetooth address (BTADDR), International Mobile Subscriber Identity (IMSI) code, Electronic Serial Number (ESN), Mobile Equipment Identifier (MEID), International Mobile Subscriber, chip specific identifier, or a combination thereof.

9. An apparatus of claim 6, wherein the apparatus is a mobile phone further comprising:
user interface circuitry and user interface software configured to facilitate user control of at least some functions of the mobile phone through use of a display and configured to respond to user input; and
a display and display circuitry configured to display at least a portion of a user interface of the mobile phone, the display and display circuitry configured to facilitate user control of at least some functions of the mobile phone.

10. A method comprising:
receiving, at an authentication platform, a request from a mobile device, different from the authentication platform, to generate a public-key certificate for accessing a service;
initiating transmission of an identity challenge from the authentication platform to the mobile device;
receiving a tag specific to the mobile device in response to the identity challenge;
calculating a partial hash of the tag;
calculating a full hash of the tag, a predetermined string, and the identity challenge;
retrieving a public-key corresponding to the mobile device;
generating a public-key signature from the full hash using the public key; and
constructing the public-key certificate to include at least the public-key signature, the public key, and the partial hash.

11. A method of claim 10, further comprising:
receiving another request from the mobile device to access the service;
initiating transmission of another identity challenge to the mobile device;
receiving, in response to the other identity challenge, another public-key signature calculated by the mobile device from another hash of the tag, the predetermined string, and the other identity challenge;
retrieving the public-key certificate corresponding to the mobile device;
extracting the public key and the partial hash from the public key-certificate;
completing the partial hash by appending a hash of the predetermined string and the other identity challenge to the partial hash;
generating a validation signature from the completed partial hash using the public key;
validating the other public-key signature against the generated validation signature;
creating a license file corresponding to the service based on the validation; and
initiating transmission of the license file to the mobile device to grant access to the service.

12. A method of claim 11, further comprising:
setting a service flag to grant access to the service by the mobile device based on the validation,
wherein the service flag grants future access to the service without revalidation of the other public-key signature or the license file.

13. A method of claim 10, wherein the tag is a service tag based on at least a portion of a fixed-form template including one or more unique identifiers corresponding to the mobile device, and wherein the one or more identifiers include an International Mobile Equipment Identity (IMEI) code, Medium Access Control (MAC) address, Bluetooth address (BTADDR), International Mobile Subscriber Identity (IMSI) code, Electronic Serial Number (ESN), Mobile Equipment Identifier (MEID), International Mobile Subscriber, chip specific identifier, or a combination thereof.

14. A method of claim 10, wherein the validation is used to inhibit automatic or mass deployment of network identities.

15. An apparatus comprising:
at least one processor; and
at least one memory including computer program code,
the at least one memory and the computer program code configured to, with the at least one processor, cause the apparatus to perform at least the following, receive, at an authentication platform, a request from a mobile device, different from the authentication platform, to generate a public-key certificate for accessing a service;
initiate transmission of an identity challenge from the authentication platform to the mobile device;
receive a tag specific to the mobile device in response to the identity challenge;
calculate a partial hash of the tag;
calculate a full hash of the tag, a predetermined string, and the identity challenge;
retrieve a public-key corresponding to the mobile device;
generate a public-key signature from the full hash using the public key; and
construct the public-key certificate to include at least the public-key signature, the public key, and the partial hash.

16. An apparatus of claim 15, wherein the apparatus is further caused to:
receive another request from the mobile device to access the service;
initiate transmission of another identity challenge to the mobile device;
receive, in response to the other identity challenge, another public-key signature calculated by the mobile device from another hash of the tag, the predetermined string, and the other identity challenge;
retrieve the public-key certificate corresponding to the mobile device;
extract the public key and the partial hash from the public key-certificate;
complete the partial hash by appending a hash of the predetermined string and the other identity challenge to the partial hash;
generate a validation signature from the completed partial hash using the public key;
validate the other public-key signature against the generated validation signature;
create a license file corresponding to the service based on the validation; and
initiate transmission of the license file to the mobile device to grant access to the service.

17. An apparatus of claim 16, wherein the other public-key signature has been validated, and the apparatus is further caused to:
set a service flag to grant access to the service by the mobile device based on the validation,
wherein the service flag grants future access to the service without revalidation of the other public-key signature or the license file.

18. An apparatus of claim 15, wherein the tag is a service tag based on at least a portion of a fixed-form template including one or more unique identifiers corresponding to the mobile device, and wherein the one or more identifiers include an International Mobile Equipment Identity (IMEI) code, Medium Access Control (MAC) address, Bluetooth address (BTADDR), International Mobile Subscriber Identity (IMSI) code, Electronic Serial Number (ESN), Mobile Equipment Identifier (MEID), International Mobile Subscriber, chip specific identifier, or a combination thereof.

* * * * *